United States Patent [19]

Stephan et al.

[11] Patent Number: 5,417,405
[45] Date of Patent: May 23, 1995

[54] OBTURATOR FOR BALL VALVE

[75] Inventors: David Stephan; Filiberto Jimenez, both of Little Rock, Ark.

[73] Assignee: Orbit Valve Company, Little Rock, Ark.

[21] Appl. No.: 225,529

[22] Filed: Apr. 11, 1994

[51] Int. Cl.⁶ .............................................. F16K 5/20
[52] U.S. Cl. ............................. 251/315.16; 251/161
[58] Field of Search .................. 251/315 BC, 161, 162

[56] References Cited

U.S. PATENT DOCUMENTS

| | | | |
|---|---|---|---|
| 2,076,840 | 4/1937 | Heggem . | |
| 2,076,841 | 4/1937 | Heggem . | |
| 3,348,805 | 10/1967 | Sanctuary | 251/315 BC X |
| 3,456,916 | 7/1969 | Ytzen et al. | 251/315 BC X |
| 3,515,371 | 6/1970 | King et al. . | |
| 5,263,685 | 11/1993 | Winnike et al. . | |

*Primary Examiner*—John C. Fox
*Attorney, Agent, or Firm*—Hill, Steadman & Simpson

[57] ABSTRACT

An improved valve sealing arrangement where a sealing surface on the valve obturator presses against a compatibly arranged valve seat circumscribing a flow path to close the flow path, or alternately, the valve obturator having a through bore rotatable into position to align with the flow path. The improvement entails forming or cutting slots into the valve obturator behind upper and lower portions of the sealing surface to give localized flexibility to the upper and lower portions to match the flexibility of the middle region of the sealing surface which is located in front of the through bore.

23 Claims, 3 Drawing Sheets

OBTURATOR FOR BALL VALVE

BACKGROUND OF THE INVENTION

This invention relates to a valve closure element or "obturator" for control of fluid flow within a valve. In particular, this invention relates to a valve closure element effective over a wide temperature and pressure range which typically interacts with a ring-type seal assembly to close the valve.

A ball valve is described in U.S. Pat. No. 3,515,371. A closure element in the form of a ball with a through aperture is pivoted about a vertical axis 90° to move from a closed to an open condition. The closure element is also pivoted slightly about a horizontal axis to press tightly against a valve seat. The closure element provides an annular band or sealing surface having a spherical or conical or other contour which mates with an annular valve seat. For an understanding of the operation of this ball valve and all relative component parts, U.S. Pat. No. 3,515,371 is herein incorporated by reference. The closure element need not be spherical as demonstrated by U.S. Pat. No. 2,076,840.

It has been experienced that during valve operation, when fluid pressure is applied against the closure element when in the closed position from the seating side of the closure element, the closure element experiences some distortion due to the fluid pressure applied. This distortion results from unequal strength or rigidity caused by unsymmetrical sections of the closure element. Such distortion can result in leakage at the 3 o'clock and 9 o'clock position of the closure element sealing surface.

FIG. 1 shows the effect of pressure on the configuration of the sealing surface. It is to be noted that at the 3 o'clock and 9 o'clock positions, position "A" in FIG. 1, the sealing surface is bowed (the bowed portion exaggerated for clarity) compared to the smaller distortion at the 12 o'clock and 6 o'clock positions at "B" and "C". In other words, a circumference "E" drawn around the sealing surface at its mean radius from a centerline of the closure element diverges from a plane to a bowed configuration. This bowing can cause leakage.

This bowing is due to the increased rigidity of the core element 10 in the top and bottom regions as compared to the center regions which are relatively weakened due to a through bore 14 formed through the core element.

SUMMARY OF THE INVENTION

It is an object of the present invention to provide an effective and leak resistant valve closure arrangement having a rotatable obturator or closure element with an annular sealing surface which seats against a stationary valve seat in such a manner as to accommodate surface pressure variations around the seat to prevent leakage particularly caused by pressure on the seat side of the closure element.

It is a further object of the invention to provide a closure element having a through passage at a first angle of orientation and a closure surface at a second angle of orientation, the closure element rotatable from said first angle to said second angle to move from an open to a closed position. It is an object of the invention to provide a tight shut-off especially to avoid leakage at the 3 o'clock and 9 o'clock positions of the closure element. It is an object of the invention to make the closure element selectively flexible at the 6 o'clock and 12 o'clock positions to equalize any distortion experienced at the 3 o'clock and 9 o'clock positions.

The objects are inventively achieved in that a closure element is provided which includes a resilient sealing surface to interact with the valve seat. In the preferred embodiment, the sealing surface is an annular band of a conical or spherical contour. The body of the closure element provides slots on a backside of the sealing surface at the 12 o'clock and 6 o'clock position to balance the rigidity of the closure element around the circumference of the sealing surface. Because of the slots, localized distortion is reduced at the 3 o'clock and 9 o'clock positions. This modification permits the previously rigid sections of the closure element to experience generally the same distortion or deflection as the less-rigid sections. The net result is improved sealing with reduced operating force requirements.

DETAILED DESCRIPTION OF THE PREFERRED EMBODIMENTS

Figure 2:
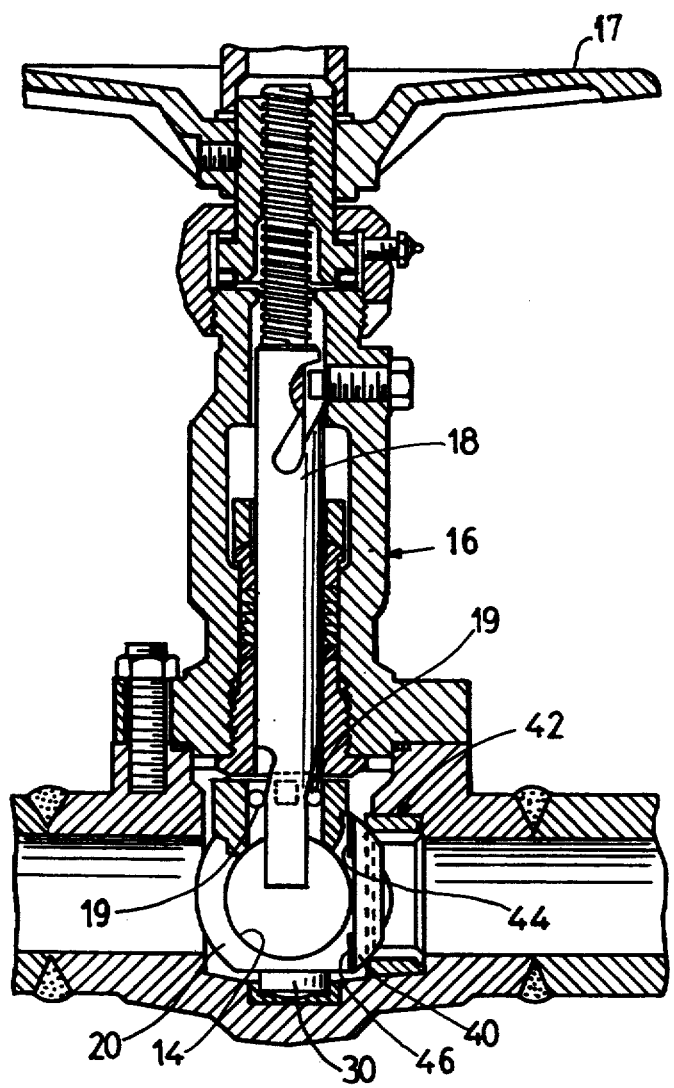
FIG. 2 is a sectional view of a valve incorporating a closure element of the present invention.

A rotary ball valve is shown in FIG. 2. A hand wheel 17, by turning, raises and turns about a vertical axis, a stem 18. The stem 18 presses against pins 19 to turn and pivot a closure element 20. Such a rotary valve is disclosed, for example, in U.S. Pat. Nos. 5,263,685 and 3,515,371. Typical rotary valves provide a cylindrical or spherical outer diameter 22 (shown in phantom in FIG. 5) for pivoting about the axis 26. Although these known valves are ball valves, the present invention encompasses any type valve where increased sealing surface flexibility is desired.

Figure 3:
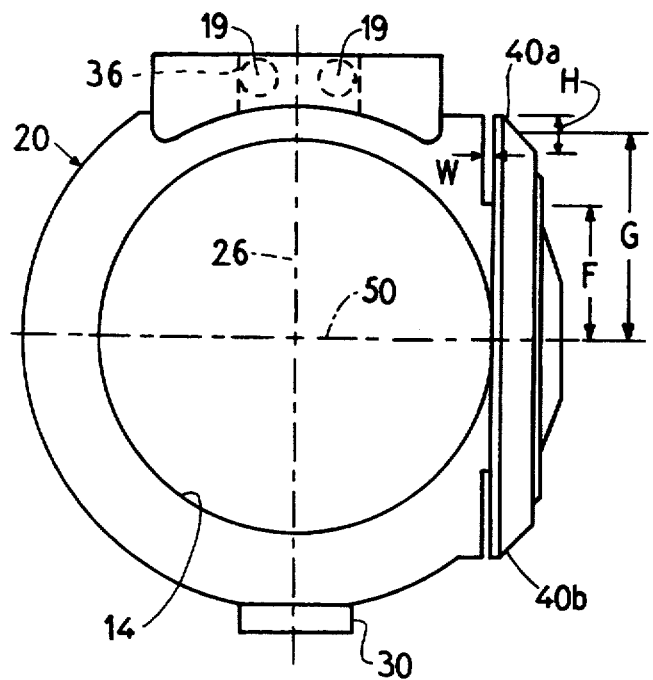
FIG. 3 is a schematic elevational view of the closing element of the present invention.
Figure 4:
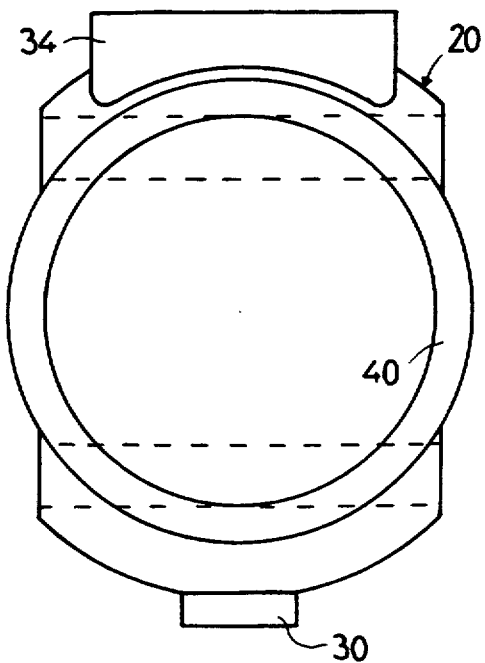
FIG. 4 is a right side view of the closing element of FIG. 3.
Figure 5:
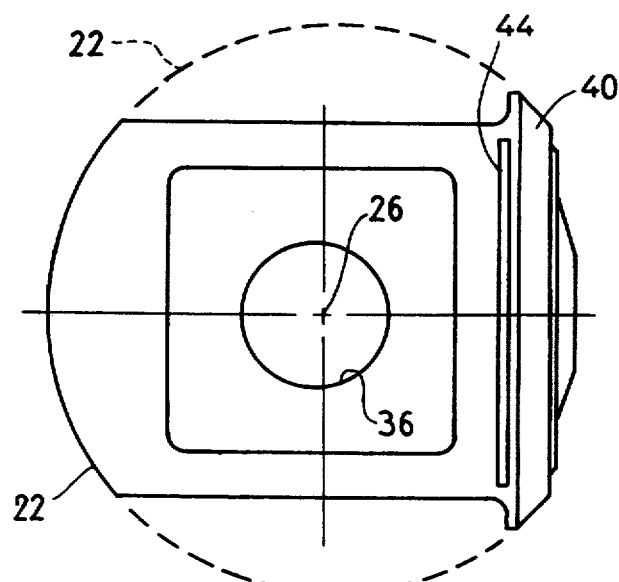
FIG. 5 is a top view of the closing element of FIG. 3.

As illustrated in FIGS. 3-5, the closure element 20 provides a bottom trunnion member 30 and a neck 34. The neck 34 provides a bore 36 for receiving the valve stem 18 such as described in U.S. Pat. No. 3,515,371. Pins 19 are provided to abut the valve stem to impart turning and pivoting of the closure element 20.

On a face side of the closure element is located a sealing surface 40 having typically a spherical or conical contour and provided of a hardened metallic material. The sealing surface 40 presses against a valve seat 42 located within the valve 16 to close the valve as described in, for example, U.S. Pat. No. 5,263,685. On a backside of the sealing face 40, an upper and lower slot 44, 46 are formed or cut extending vertically toward a horizontal centerline 50 of the element 20.

The slots 44, 46 proceed vertically inwardly to a position "F" inward of a mean radius "G" of the sealing surface 40, and inward of top and bottom portions 40a, 40b of the surface 40. The slots 44, 46 proceed inward to a depth greater than a radial width "H" of the sealing surface 40. The top and bottom portions 40a, 40b are now cantilevered from the element 20. For a typical 10 inch, 300 pound valve having G=5 inches, the slots 44, 46 are saw cut to an elevation of approximately F=3.5 inches from the centerline 50. For this valve, the ratio of F/G is approximately 0.7. The saw cut width "W" is typically between 0.042 and 0.072 inches.

Figure 1:
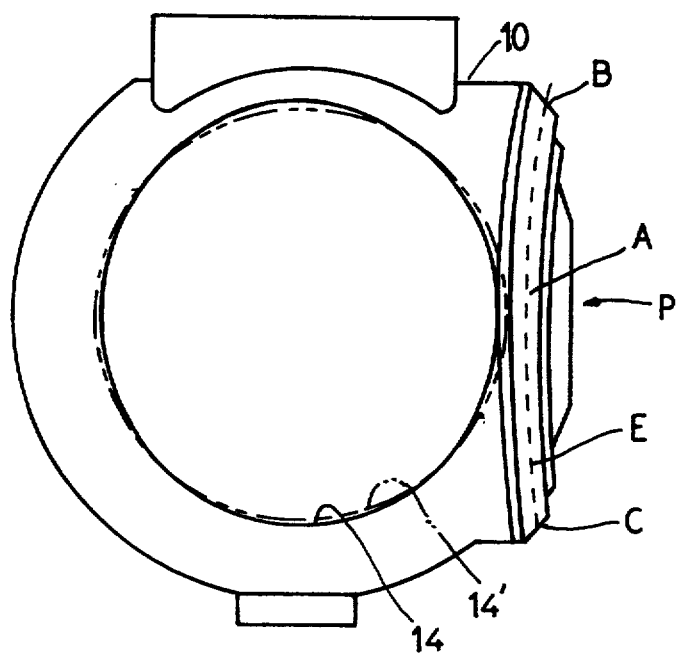
FIG. 1 is a schematic elevational view of a prior art closure element under influence of pressure.
Figure 6:
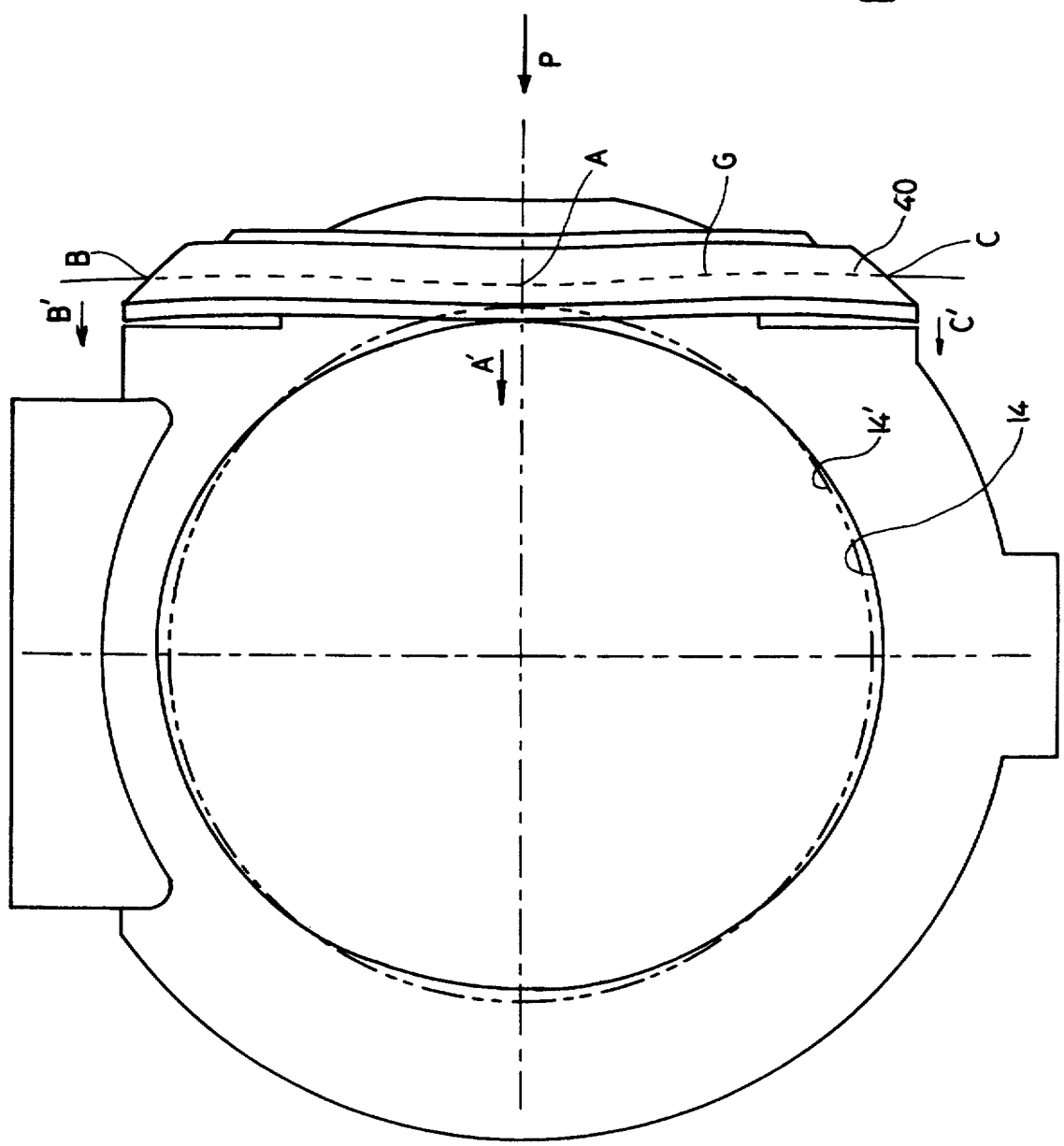
FIG. 6 is an enlarged elevational view of the closing element of FIG. 3 showing the effect of pressure on the distortion of the closing element to be compared with FIG. 1.

As shown exaggerated in FIG. 6, under influence of pressure "P" from the valve seat side, the sealing surface 40 at the 12 o'clock and 6 o'clock positions "B","C" can flex in directions "B'","C'" which compensates for the distortion at the 9 o'clock and 3 o'clock positions "A" which flexes in a direction "A'" as shown in the prior art element of FIG. 1. The sealing surface 40 maintains an approximate planar circumference at its mean radius "G" which provides for closer conforming to the valve seat 42. FIGS. 1 and 6 illustrate the original bore contour 14' and the distorted contour 14 under influence of pressure.

Although the present invention has been described with reference to a specific embodiment, those of skill in the art will recognize that changes may be made thereto without departing from the scope and spirit of the invention as set forth in the appended claims.

We claim as our invention:

1. In a valve having a valve body with a first through bore with a circumscribing valve seat and a valve closure element, the valve closure element having a body portion with a second through bore having a bore axis positionable in registry with said first through bore for flow through said valve and a circular sealing surface applied on a sealing portion of said valve closing element and having a central axis and positionable to press against said valve seat to seal against said valve seat to prevent flow through said valve, said sealing portion connected to said body portion, the improvement comprising:
providing a first slot and a second slot into said valve closure element behind said sealing surface, said sealing portion providing a first region, a second central region and a third region, arranged contiguously divided by two geometric chords through the circular sealing surface, said first region having said first slot separating said first region from said body portion, said second region connected solidly to said body portion and said third region separated from said body portion by said second slot, said first slot and said second slot extending perpendicular to said central axis of said sealing surface and terminating a distance from said central axis, said first slot and said second slot providing localized flexibility of said sealing surface in a deflection direction away from said valve seat.

2. The improvement according to claim 1, wherein said bore axis is at an angle from said central axis of said sealing surface, said valve closure element pivotable about a third axis to alternately align either said second through bore or said sealing surface to said valve seat, said first slot arranged extending from a first extreme position on said closure element and penetrating toward a center of said closure element in a direction parallel to said third axis, and said second slot is arranged exposed on a second extreme position of said valve closure element extending toward said center of said closure element in a direction parallel to said third axis, said first and second extreme positions 180° apart.

3. The improvement according to claim 2, wherein said first axis and said second axis are arranged at 90°.

4. The improvement according to claim 2, wherein said first slot and said second slot extend for a depth greater than a radial width of said sealing surface.

5. The improvement according to claim 1, wherein said sealing surface comprises a spherical contour and is in the shape of a ring.

6. The improvement according to claim 5, wherein said sealing surface comprises a hardened metallic surface.

7. The improvement according to claim 1, wherein the ratio of a radially measured distance of a terminal inward end of the first slot to a mean radius of the sealing surface and the second slot to the mean radius of the sealing surface, is approximately 0.7.

8. The improvement according to claim 1, wherein said first slot and said second slot are saw cut having a thickness measurement between 0.04 and 0.07 inches.

9. The improvement according to claim 1 wherein said first and second slots proceed inwardly to a depth beyond a radial width of said sealing surface, said first and second slots arranged 180° apart.

10. A valve, comprising:
a valve body having a first flow bore therethrough for installing in a pipe, said valve body having a top opening and an annular valve seat therein circumscribing said first flow bore;
a core element having a core body with a second flow bore therethrough, said core element held within said valve body and turnable to align said second flow bore with said first flow bore for flow through said valve, said core element having an annular sealing surface applied onto said core body and having a size and shape adapted to press against said valve seat to close said first flow bore upon turning said core element to a closed position, said sealing surface having a first portion adapted to press against said valve seat and which is cantilevered outwardly from said core body to allow a degree of localized flexibility of said sealing surface in a direction away from said valve seat, and a second portion adapted to press against said valve seat and contiguous with said first portion, said second portion fixed rigidly with respect to said core body, having a lesser localized flexibility in a direction away from said valve seat compared to said first portion.

11. The valve according to claim 10, wherein said body comprises a ball having said second bore arranged horizontally therethrough at a 90° angle from an axis of said sealing surface.

12. The valve according to claim 11, wherein said sealing surface comprises a hardened metal annulus having a spherical contour.

13. The valve according to claim 10, wherein said cantilevered first portion is formed by arranging a first slot exposed on an outside of said core element and proceeding inwardly a distance.

14. The valve according to claim 13, wherein with said second flow bore oriented horizontally, said first slot is formed into a top of said core body proceeding vertically inwardly to a distance below a mean radius of the sealing surface; and further comprising a second slot formed into a bottom of said core body proceeding vertically inwardly to a distance above a mean radius of the sealing surface.

15. The valve according to claim 14, wherein a ratio of distances between a centerline of said first flow bore and a terminus of said first slot to a median radius of said sealing surface is approximately 0.7.

16. The valve according to claim 15, wherein said first slot has a width of approximately 0.04 to 0.07 inches.

17. The valve according to claim 10 further comprising a third portion contiguous with said second portion and opposite said first portion, and cantilevered outwardly from said core body to allow a degree of flexibility of said sealing surface in a direction away from said valve seat, said third portion arranged 180° apart from said first portion.

18. A valve, comprising:
a valve body having a first flow bore therethrough, said valve body having an annular valve seat therein circumscribing said first flow bore;
a core element having a core body with a second flow bore therethrough, said core element held within said valve body and turnable to align said second flow bore with said first flow bore for flow through said valve, said core element having an annular sealing surface applied onto said core body and having a size and shape adapted to press against said valve seat to close said first flow bore upon turning said core element to a closed position, and with said valve oriented with an axis of said second flow bore horizontal, said core body having a first slot formed therein from an upper side of said core body downward and a second slot formed in said core body from a lower side of said core body upward, causing said sealing surface to have an upper portion which is cantilevered outwardly from said core body to allow a degree of localized flexibility of said sealing surface in a direction away from said valve seat, and a central portion contiguous with said upper portion, said central portion fixed rigidly with respect to said core body and a lower portion contiguous with said central portion and cantilevered outwardly from said core body to allow localized flexibility of said sealing surface in the direction away from said valve seat, said upper, central and lower portions together defining said annular sealing surface.

19. The improvement according to claim 18, wherein said first slot and said second slot extend for a depth greater than a radial width of said sealing surface.

20. A valve according to claim 18, wherein said first slot and said second slot each terminate in a flat planar wall.

21. A valve, comprising:
a valve body having a first flow bore therethrough, said valve body having an annular valve seat therein circumscribing said first flow bore;
a core element having a solid core body with a second flow bore therethrough having a central axis, said core element having an annular sealing surface applied onto said core body at a position apart from said second flow bore, said sealing surface having a size and shape adapted to be pressable against said valve seat to close said first bore, said core body rotatable within said valve body to alternately register said second flow bore or said sealing surface with said valve seat to open and close said valve respectively; and
means provided between said sealing surface and said core body for providing increased flexibility of the sealing surface to deform in a direction away from said valve seal in a first sealing region at a distance from a plane which includes said central axis of said flow bore and which bisects said sealing surface, and in a second sealing region at a distance from said plane opposite said first region, increased flexibility compared to the flexibility of a central sealing region between and contiguous with said first and second sealing regions.

22. The valve according to claim 21, wherein said means for providing increased flexibility includes first and second slots formed into said core body behind said first and second sealing regions, respectively, and wherein said central sealing region is solidly backed by said core body.

23. The valve according to claim 22, wherein said first and second slots terminate in flat bottoms corresponding to geometric chords of the annular sealing surface, said geometric chords parallel to and at a distance from said plane.

* * * * *